Figure 3:
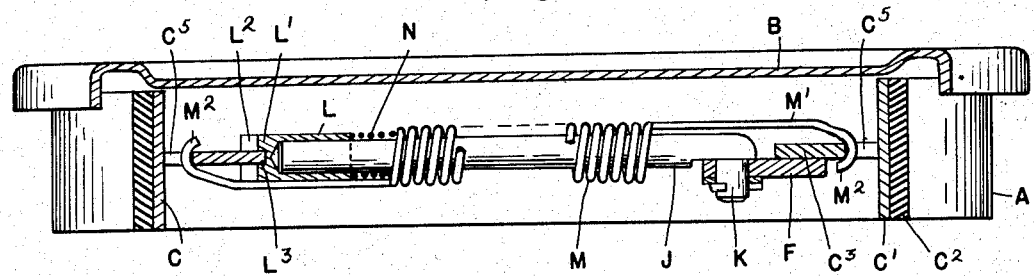

Sept. 28, 1937.  J. W. WHITE  2,094,391
BRAKE CONSTRUCTION
Filed July 27, 1936   2 Sheets-Sheet 1
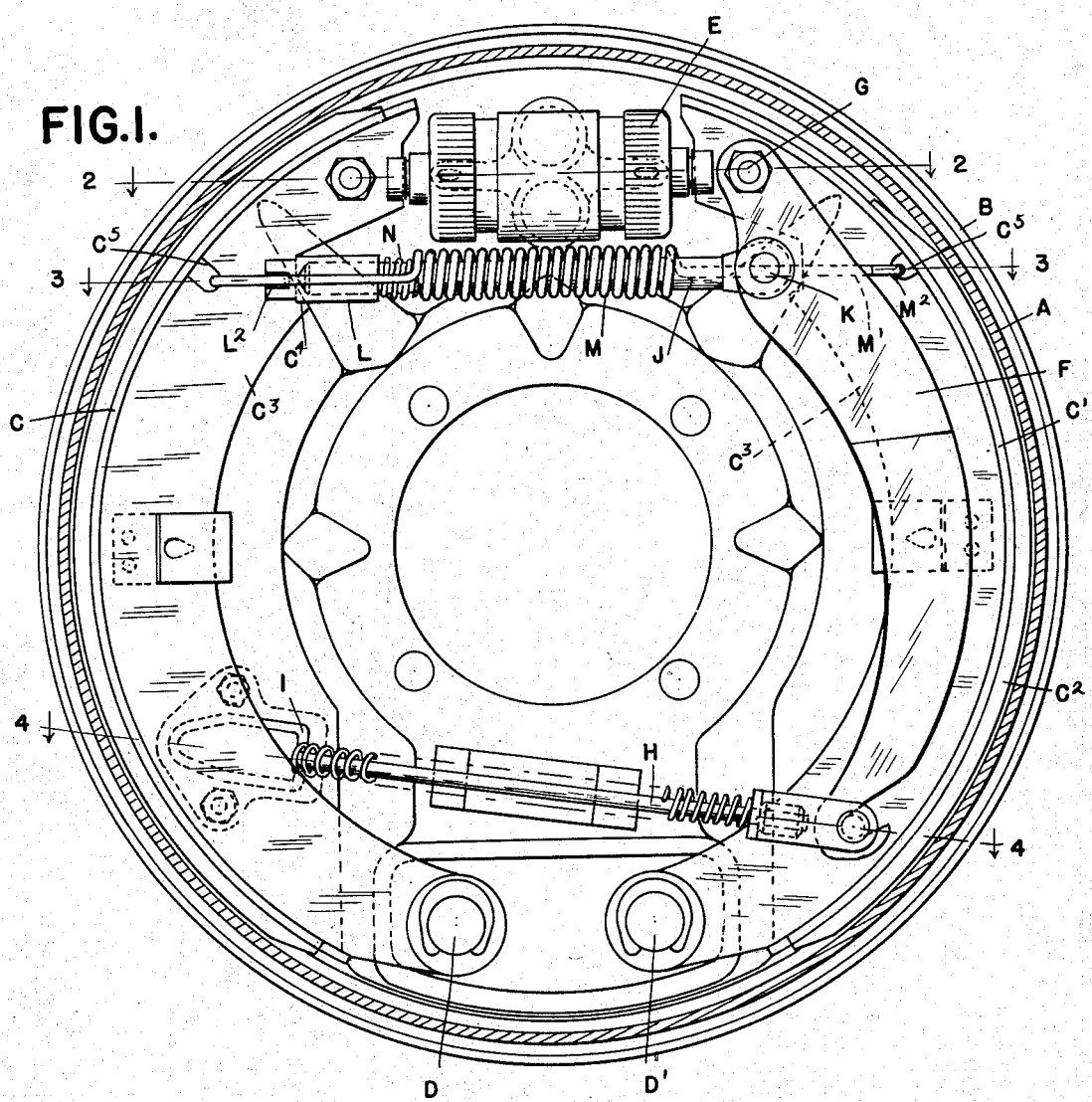
INVENTOR
JOHN WILLIAM WHITE
BY Whittemore Hulbert & Belknap
ATTORNEYS Sept. 28, 1937.  J. W. WHITE  2,094,391

BRAKE CONSTRUCTION

Filed July 27, 1936  2 Sheets-Sheet 2

INVENTOR
JOHN WILLIAM WHITE
BY Whittemore Hulbert & Belknap
ATTORNEYS

Patented Sept. 28, 1937

2,094,391

UNITED STATES PATENT OFFICE 2,094,391

BRAKE CONSTRUCTION

John William White, South Bend, Ind., assignor to Kelsey-Hayes Wheel Company, Detroit, Mich., a corporation of Delaware Application July 27, 1936, Serial No. 92,875

4 Claims. (Cl. 188—106)

The invention relates to wheel brakes of that type adapted for alternative hydraulic and mechanical operation, and the invention consists in certain features of construction as hereinafter set forth.

Figure 4:
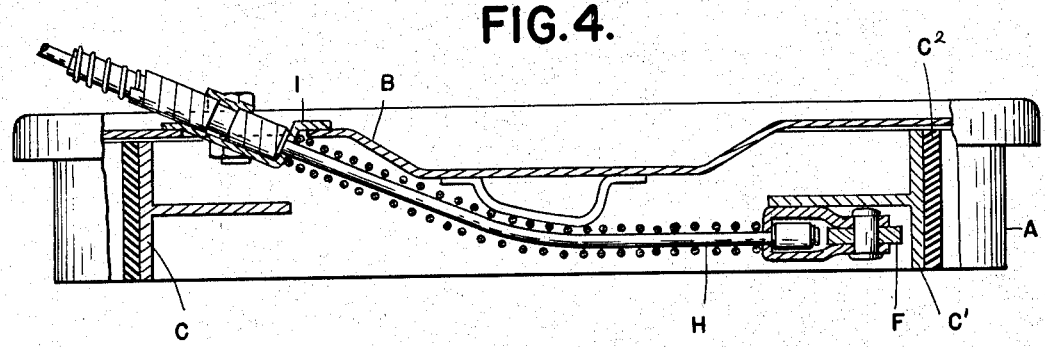

In the drawings:

Figure 1 is an elevation of the brake head or cover plate with the brake mechanism mounted thereon;

Figure 2 is a section on line 2—2 of Figure 1;
Figure 3 is a section on line 3—3 of Figure 1;
Figure 4 is a section on line 4—4 of Figure 1.

In general construction the brake mechanism includes a revoluble drum A, a stationary head or cover plate B, brake means mounted on the cover plate preferably a pair of shoes C and C' with linings $C^2$ having the anchor pivots D and D' at one end thereof and a hydraulic actuator E arranged between the opposite ends. There is also a mechanical actuator including a segmental lever arm F pivotally attached at G to one of the brake shoes such as C' and having its opposite end connected to a flexible cable H which passes through a guide bearing I in the cover plate B and extends to the manual actuator (not shown). Intermediate the pivot G and the actuating end of the lever F is pivotally attached thereto a push rod J, the opposite end of which engages the shoe C, the arrangement being such that the rocking of the lever F by pull of the cable H will move the shoes oppositely into braking engagement with the drum A.

With the construction as thus far described the amount of movement of the cable H required to force the shoes into braking contact with the drum is dependent upon the thickness of the linings $C^2$. Thus when these linings become worn a very much greater movement of the cable and correspondingly greater angular movement of the lever F is required than when initially operated. It is, therefore, one of the objects of the present invention to provide a means of adjustment through which after wear occurs the length of the push rod J may be lengthened. A further object of the invention is to economize space for the actuating mechanism within the brake drum by passing this push rod through the axis of the helical spring which is used for retracting the shoes when braking pressure is released. With these and other objects in view the invention consists in the construction as will be now described.

The rod J is attached to the web portion $C^3$ of the brake shoe C' by a pivot pin K projecting laterally from said rod through an aperture in said web portion. The opposite end of the rod J telescopically engages a sleeve L which sleeve has an end portion L' provided with transverse slots $L^2$ and $L^3$, the slot $L^3$ being of greater depth than the slot $L^2$. Thus the end of the sleeve is bifurcated in transverse planes to embrace the web portion $C^3$ of the shoe C which web is notched at $C^4$ to form a bearing for the sleeve. M is a helical spring surrounding the rod J and provided at its opposite ends with extensions M' having hooks $M^2$ for engaging apertures $C^5$ in the webs of the shoes. Thus the resiliency of the spring M will retract the shoes to disengage the same from braking contact with the drum, while the push rod J together with the sleeve L will force the shoes in braking engagement under the actuation of the lever F. When the shoes are actuated by the hydraulic actuator E the rod J will be moved outward from the sleeve L and to insure this operation a light tension spring N is placed between the end of the spring M and the inner end of the sleeve L. Thus the slotted end of the sleeve will be maintained in contact with the web $C^3$ of the shoe C even when the brake is operated by the hydraulic actuator.

As has been stated the depth of the slot $L^2$ is less than the depth of the slot $L^3$. Thus when the brake mechanism is first set up and the linings $C^2$ of the shoes are unworn the sleeve L will be engaged with the web $C^3$ by inserting the latter in the slot $L^3$ the depth of which is sufficient to permit full retraction of the shoes. Subsequently after the shoes are worn the sleeve L may be disengaged from the shoe and rotated to engage the slot $L^2$ which has the effect of lengthening the push rod J so as to hold the shoes farther apart in retracted position. This will lessen the amount of movement required in the lever F and cable H for applying braking pressure over that which would be required with the worn shoes and without such adjustment, making this movement substantially the same as that for the unworn linings with the other adjustment. This is advantageous as it requires less movement of the brake lever.

What I claim as my invention is:

1. In a brake mechanism including a brake drum, a brake head and brake shoes pivotally mounted on said head, mechanical actuating means for said shoes including a lever fulcrumed on one of said shoes, a push rod pivotally connected to said lever and extending to the opposite shoe, a telescopic extension of said push rod engaging the latter shoe, a helical spring sleeved upon said push rod and connected to said shoes to retract the same, and a low tension spring also sleeved on said rod between said first mentioned spring and said telescopic extension to hold the latter in engagement with the shoe.

2. In a brake mechanism including a brake drum and a brake head, brake shoes pivotally attached at one end thereof to said head, linings on said shoes for frictionally engaging said drum, mechanical actuating means for said shoes including a lever fulcrumed on one of said shoes, a push rod pivotally engaging said lever and extending to the other shoe, and a telescopic extension of said push rod provided with a plurality of bearings for alternatively engaging said shoe, said bearings being differently positioned with respect to said push rod whereby adjustment in the length of said rod can be made to compensate for wear in said linings.

3. In a brake mechanism including a brake drum and a brake head, a pair of brake shoes pivotally mounted at one end on said brake head, a hydraulic actuator located between the free ends of said shoes, additional mechanical actuating means including a lever fulcrumed on one of said shoes, a push rod pivotally engaging said lever and extending to the opposite shoe and a telescopic extension of said push rod engaging the latter shoe, and resilient means for holding said extension in contact with its shoe when said shoes are actuated by said hydraulic actuator.

4. In a brake mechanism including a brake drum and a brake head, a pair of brake shoes pivotally mounted on said head, linings on said shoes for frictionally engaging said drum, a mechanical actuating means for said shoes including a lever fulcrumed on one of said shoes, a push rod pivotally engaging said lever and extending to the other of said shoes, and a sleeve telescopically engaging said push rod and having an end portion slotted in transverse planes to different depths, the ends of said slots forming bearings for engaging said shoe whereby adjustment from one of said bearings to another will alter the length of said rod to compensate for wear.

JOHN WILLIAM WHITE.